(12) United States Patent
Burch et al.

(10) Patent No.: US 10,917,480 B2
(45) Date of Patent: Feb. 9, 2021

(54) SERVICE ORCHESTRATION ACROSS MULTIPLE SERVICE DOMAINS

(71) Applicant: Telefonaktiebolaget LM Ericsson (publ), Stockholm (SE)

(72) Inventors: Hans-Ruodi Burch, Bern (CH); Raphael Aebersold, Thun (CH); Ulrich Hostettler, Zollikofen (CH); Frank-Peter Jost, Zollikofen (CH); Pierre-André Roubaty, Marly (CH); Christof Wagner, Ostermundigen (CH)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/621,758

(22) PCT Filed: Jun. 12, 2018

(86) PCT No.: PCT/IB2018/054266
§ 371 (c)(1),
(2) Date: Dec. 12, 2019

(87) PCT Pub. No.: WO2018/229660
PCT Pub. Date: Dec. 20, 2018

(65) Prior Publication Data
US 2020/0145502 A1    May 7, 2020

(30) Foreign Application Priority Data

Jun. 13, 2017  (EP) .................................... 17175866

(51) Int. Cl.
*H04L 15/16* (2006.01)
*H04L 29/08* (2006.01)
(Continued)

(52) U.S. Cl.
CPC .......... *H04L 67/16* (2013.01); *H04L 61/1541* (2013.01); *H04L 61/1588* (2013.01);
(Continued)

(58) Field of Classification Search
CPC ... H04L 67/16; H04L 67/306; H04L 61/1541; H04L 61/1588; H04W 4/50; H04W 8/18; H04W 12/06
(Continued)

(56) References Cited

U.S. PATENT DOCUMENTS 7,496,637 B2   2/2009  Han et al.
8,392,465 B2 * 3/2013  Bojanic ................. G06F 16/217
                                                            707/797
(Continued)

OTHER PUBLICATIONS

International Search Report and Written Opinion of the International Searching Authority, PCT/IB2018/054266, dated Sep. 6, 2018, 9 pages.

*Primary Examiner* — Moustafa M Meky
(74) *Attorney, Agent, or Firm* — Sage Patent Group

(57) ABSTRACT

A method includes: (a) setting up a service orchestration rule set between a home operator and a sponsor service provider, managing a service domain for obtaining a data structure for a service definition object; (b) receiving a list of available services from the sponsor service provider; (c) receiving a subscriber selection of at least one service from the list; (d) adding a first set of data including subscriber specific data to the service definition object; (e) sending a service creation request to the sponsor service provider for subscribing to the selected service; and (f) receiving a response from the sponsor service provider including the service definition object complemented with a second set of data to allow the selected service to be executed.

26 Claims, 7 Drawing Sheets

(51) Int. Cl.
*H04W 4/50* (2018.01)
*H04L 29/12* (2006.01)
*H04W 8/18* (2009.01)
*H04W 12/06* (2021.01)

(52) U.S. Cl.
CPC ............ *H04L 67/306* (2013.01); *H04W 4/50* (2018.02); *H04W 8/18* (2013.01); *H04W 12/06* (2013.01)

(58) Field of Classification Search
USPC ........................................................ 709/223
See application file for complete search history.

(56) References Cited

U.S. PATENT DOCUMENTS

| | | | |
|---|---|---|---|
| 8,422,514 B1* | 4/2013 | Kothari | H04L 12/4633 |
| | | | 370/466 |
| 9,049,187 B2* | 6/2015 | Busschbach | H04L 41/12 |
| 9,769,070 B2* | 9/2017 | Basunov | H04L 45/302 |
| 9,769,152 B2* | 9/2017 | Flamini | H04L 63/0823 |
| 9,961,062 B2* | 5/2018 | Degenkolb | H04L 63/0281 |
| 9,990,426 B2* | 6/2018 | Micucci | G06F 21/6209 |
| 2006/0242248 A1 | 10/2006 | Kokkinen | |
| 2007/0130343 A1 | 6/2007 | Pardo-Blazquez et al. | |
| 2011/0276603 A1* | 11/2011 | Bojanic | G06F 16/25 |
| | | | 707/797 |
| 2013/0227169 A1* | 8/2013 | Busschbach | H04L 41/5077 |
| | | | 709/241 |
| 2016/0218971 A1* | 7/2016 | Basunov | H04L 45/70 |
| 2016/0283460 A1* | 9/2016 | Weald | H04L 67/42 |
| 2017/0374060 A1* | 12/2017 | Flamini | H04L 63/0807 |
| 2020/0004783 A1* | 1/2020 | Micucci | H04L 63/08 |

* cited by examiner

SERVICE ORCHESTRATION ACROSS MULTIPLE SERVICE DOMAINS

CROSS REFERENCE TO RELATED APPLICATIONS

This application is a 35 U.S.C. § 371 national stage application of PCT International Application No. PCT/IB2018/054266 filed on Jun. 12, 2018, which in turn claims priority to European Patent Application No. 17175866.7 filed on Jun. 13, 2017, the disclosures and content of which are incorporated by reference herein in their entirety.

TECHNICAL FIELD

The present invention relates to a method of orchestrating services in a communication network. More specifically, according to the proposed method, services are orchestrated across at least two different service domains in the communication network. The invention also relates to a communication network where the method can be carried out.

BACKGROUND OF THE INVENTION

Subscribers of communication network operators, such as mobile network operators (MNOs) or mobile virtual network operators (MVNOs), can use operator-specific services, also known as native services, such as voice or short message service (SMS), or over-the-top (OTT) services or content, such as WhatsApp®, where the network operator merely provides the communication channel. Currently each operator itself has to provide a fully fledged service infrastructure including supplementary services, fulfilment, assurance, legal interception (also known as lawful interception), billing etc. On the other hand, OTT services are not integrated into the operator service environment (concerning billing, assurance etc) and cannot be influenced/controlled/developed by the operator. In the present description, OTT is a term used to refer to audio, video, and/or other media content transmitted via the internet without a network operator controlling or distributing the content.

Network operators typically offer a rather limited number of services to their clients. However, designing and implementing new services is rather time consuming and costly. Due to the reasons above, currently there is missing a simple, quick and reliable manner of integrating new services into a network operator's native service domain.

US2007130343 provides an identity generator device arranged to generate a user's service indicator to identify the user between a service provider and an identity provider, the user's service indicator comprising a master user's identifier for identification of the user at the identity provider, and a service identifier indicating the services to be accessed at a given service provider.

SUMMARY OF THE INVENTION

It is an object of the present invention to overcome at least some of the problems identified above relating to providing new services in communication networks.

According to a first aspect of the invention, there is provided a method of orchestrating services across at least two different service domains in a communication network, the method being carried out by a processing unit of a first service provider, referred to as a home operator, managing a first service domain, and comprising receiving a data structure for a service definition object from a second service provider, referred to hereinafter as a sponsor service provider, managing a second service domain, the home operator being identified by a home operator identifier. The method further comprises receiving a list of available services from the sponsor service provider, the services on the list being individually identified by a service identifier and receiving a subscriber selection of at least one service on the list from a subscriber of the home operator, the subscriber being identified by a subscription identifier. The method further comprises adding a first set of data to the service definition object to obtain a populated service definition object, the first set of data comprising at least subscriber specific data and sending a service creation request to the sponsor service provider for subscribing to the selected service, the request comprising the home operator identifier, the subscription identifier, a service identifier of the selected service, the populated service definition object and a service instance identifier. The method further comprises receiving a response from the sponsor service provider, the response comprising the populated service definition object complemented with a second set of data to allow the selected service to be executed.

According to a second aspect of the invention, there is provided a computer program product arranged to execute the method according to the first aspect of the present invention.

According to a third aspect of the invention, there is provided a processing unit arranged to carry out the method according to the first aspect of the present invention.

According to a fourth aspect of the invention, there is provided a method of orchestrating services across at least two different service domains in a communication network, the method being carried out by a processing unit of a second service provider, referred to as sponsor service provider, managing a second service domain and comprising sending a data structure for a service definition object to a first service provider, referred to hereinafter as a home operator, managing a first service domain, the home operator being identified by a home operator identifier and sending a list of available services to the home operator, the services on the list being individually identified by a service identifier. The method further comprises receiving a service creation request from the home operator for subscribing to the selected service, the request comprising the home operator identifier, a subscription identifier of a subscriber of the home operator, a service identifier of a selected service, a populated service definition object including a first set of data comprising subscriber specific data and a service instance identifier and sending a response to the home operator, the response comprising the populated service definition object complemented with a second set of data to allow the selected service to be executed.

According to a fifth aspect of the invention, there is provided a computer program product arranged to execute the method according to the fourth aspect of the present invention.

According to a sixth aspect of the invention, there is provided a processing unit arranged to carry out the method according to the fourth aspect of the present invention.

According to a seventh aspect of the invention, there is provided a system comprising a processing unit according to the third aspect and a processing unit according to the sixth aspect.

Other aspects of the invention are recited in the dependent claims attached hereto.

In the above aspects, the term "processing unit" may comprise one or more processors, be it general purpose processor(s) like CPU(s) or specialized processors like digital signal processors or the like, or virtual processors or machines being operated on general purpose or dedicated hardware. These processing units may be associated with or being operated under control of the first resp. second service providers when carrying out the aforementioned methods.

The proposed new solution has the advantage that a sponsor service provider is able to provide services that are integrated as native services into a home operator full service domain. Since the present invention implements service orchestration, it is easy to enhance existing services provided by the home operator. For example, if the home operator wants to enhance existing services with new features, these features can be provided by the sponsor operator. An example would be specific push-to-talk services for a small group of users as an enhancement of the already offered voice service. The proposed solution also increases public safety, because thanks to the invention, the home operator is able to offer public safety specific services executed by the sponsor service provider.

BRIEF DESCRIPTION OF THE DRAWINGS

Other features and advantages of the invention will become apparent from the following description of a non-limiting example embodiment, with reference to the appended drawings, in which.

DETAILED DESCRIPTION OF AN EMBODIMENT OF THE INVENTION

Figure 1:
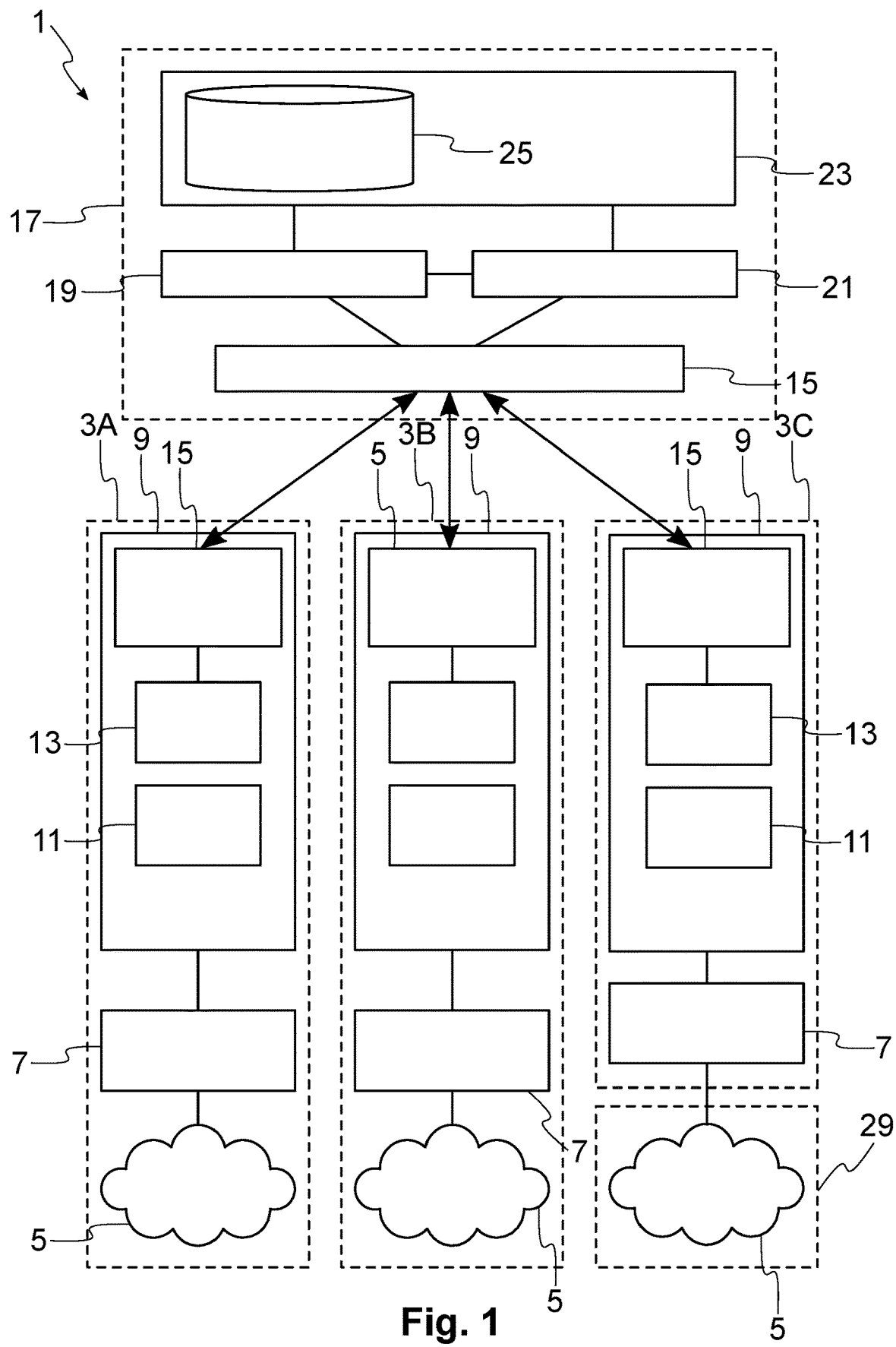
FIG. 1 is a block diagram illustrating some elements of a communication network according to an example of the present invention.

An embodiment of the present invention will now be described in detail with reference to the attached figures. This non-limiting embodiment is described in the context of a wireless cellular communication network. However, the teachings of the present invention are not limited to this environment and could be used in a wired communication network instead. Identical or corresponding functional and structural elements which appear in the different drawings are assigned the same reference numerals.

FIG. 1 is a block diagram illustrating some communication network elements, which may be useful for understanding the teachings of the present invention. The communication network 1 in this example comprises two full service providers, which in this example are communication network operators. In FIG. 1, the service domain on the left is a first full service provider domain and is referred to as a first service domain 3A or a first home operator service domain and is owned and operated (managed) by a first home operator. An operator is understood to be a full service provider if it provides both connectivity and multimedia/data/voice services. A second full service provider is shown on the right-hand side of the first home operator service domain 3A. Each of the full service providers provides a full service domain comprising native operator services and OTT services.

As shown in FIG. 1, the first home operator service domain 3A comprises an access network 5, which in this example is a radio access network, and which allows subscribers to access the first home operator service domain 3A. The access network 5 is connected to its own service execution or delivery factory 7 arranged to execute the services provided by the first home operator. The service execution factory 7 is connected to an operator fulfilment and assurance domain 9 which in turn comprises a home operator service inventory domain 11 and a home operator user inventory domain 13. The home operator service inventory domain 11 comprises for example a service catalogue comprising a sponsor services list and a home operator services list. The subscribers of the first home operator are able to select and subscribe to services from the service catalogue. The services listed in the sponsor services list are provided by a third party service provider, referred to as the sponsor service provider. The home operator user inventory domain 13 comprises a subscriber or user list of the first home operator. A sponsor service creation and pairing algorithm 15 is also part of the operator fulfilment and assurance domain 9 and is arranged to cooperate or bidirectionally communicate with a corresponding algorithm of a second service domain 17, referred to hereinafter as a sponsor service provider domain, which is owned and operated by a second service provider which in this example is the sponsor service provider.

The sponsor service provider domain 17 also comprises the sponsor service creation and pairing algorithm 15, which, as mentioned, is arranged to cooperate with the sponsor service creation and pairing algorithm 15 on the home operator side. Both the sponsor service creation and pairing algorithms (on the sponsor service provider and home operator sides) are arranged to interact with each other so that the sponsor services become part of the home operator service inventory domain 11. Thus, the sponsor creation and pairing algorithms 15 are arranged to configure a service for a specific user and to include that service in the list of the subscribed services of that specific user. The sponsor service creation and pairing algorithm 15 of the sponsor service provider domain 17 is arranged to communicate with a sponsor service provider service inventory domain 19 and a sponsor service provider user inventory domain 21. These two inventory domains 19, 21 are in turn arranged to communicate with a sponsor service provider home operator object 23, referred to simply as a home operator object, comprising a sponsor service provider home operator service catalogue database 25, which is connected to a sponsor service provider service inventory database 26 (see FIG. 2) listing all the services provided by this specific sponsor service provider. As is better shown in FIG. 2, the home operator object 23 bridges the sponsor service provider service inventory domain 19 and the sponsor service provider user inventory domain 21. The home operator object 23 may be stored in a sponsor service provider home operator inventory database 28. The purpose and operation of the elements of the sponsor service provider domain 17 is explained later in more detail when describing the proposed service orchestration method. It is to be noted that all the elements described above which are part of the sponsor service provider domain 17 are owned and operated by the sponsor service provider, whereas all the elements described as being part of the first home operator service domain 3A are owned and operated by the first home operator apart from the sponsor service creation and pairing algorithm 15, which in this example is owned and operated by the sponsor service provider.

FIG. 1 further shows a third service domain 3B, referred to as a second home operator service domain, and which is owned and operated by a third operator, referred to as a second home operator. The second home operator manages the second full service provider domain in the example network of FIG. 1. The second home operator service domain 3B is substantially identical to the first home operator service domain 3A with its own service execution factory 7, fulfilment and assurance domain 9 and sponsor service creation and pairing algorithm 15 corresponding to the ones of the first home operator service domain 3A. For this reason, the second home operator service domain 3B is not further described here.

In this example, the communication network 1 also comprises an access domain 29 providing access to a fourth service domain, referred to as an MVNO home operator service domain 3C, which comprises elements equivalent to the elements in the first or second home operator service domains 3A, 3B but which are part of the MVNO. It is to be noted that an MVNO is understood to be a network operator, which does not have its own access network domain, or simply access network, but uses an access network of a licensed network operator. An MVNO can rent the operator services or provide their own ones based on the level of integration. The access domain 29 together with the MVNO home operator service domain 3C provides selected services, such as connectivity, roaming, interconnection, billing etc. In the following description, when referring to an operator, this operator is understood to cover various types of operators, such as the full service operators and the virtual operators. In the present description, a sponsor service provider side is understood to cover a first network part, which includes elements which are part of the sponsor service provider domain 17. On the other hand, an operator side is understood to cover a second network part, which includes elements which are part of an operator domain, ie in FIG. 1 the elements outside the sponsor service provider domain 17.

Figure 2:
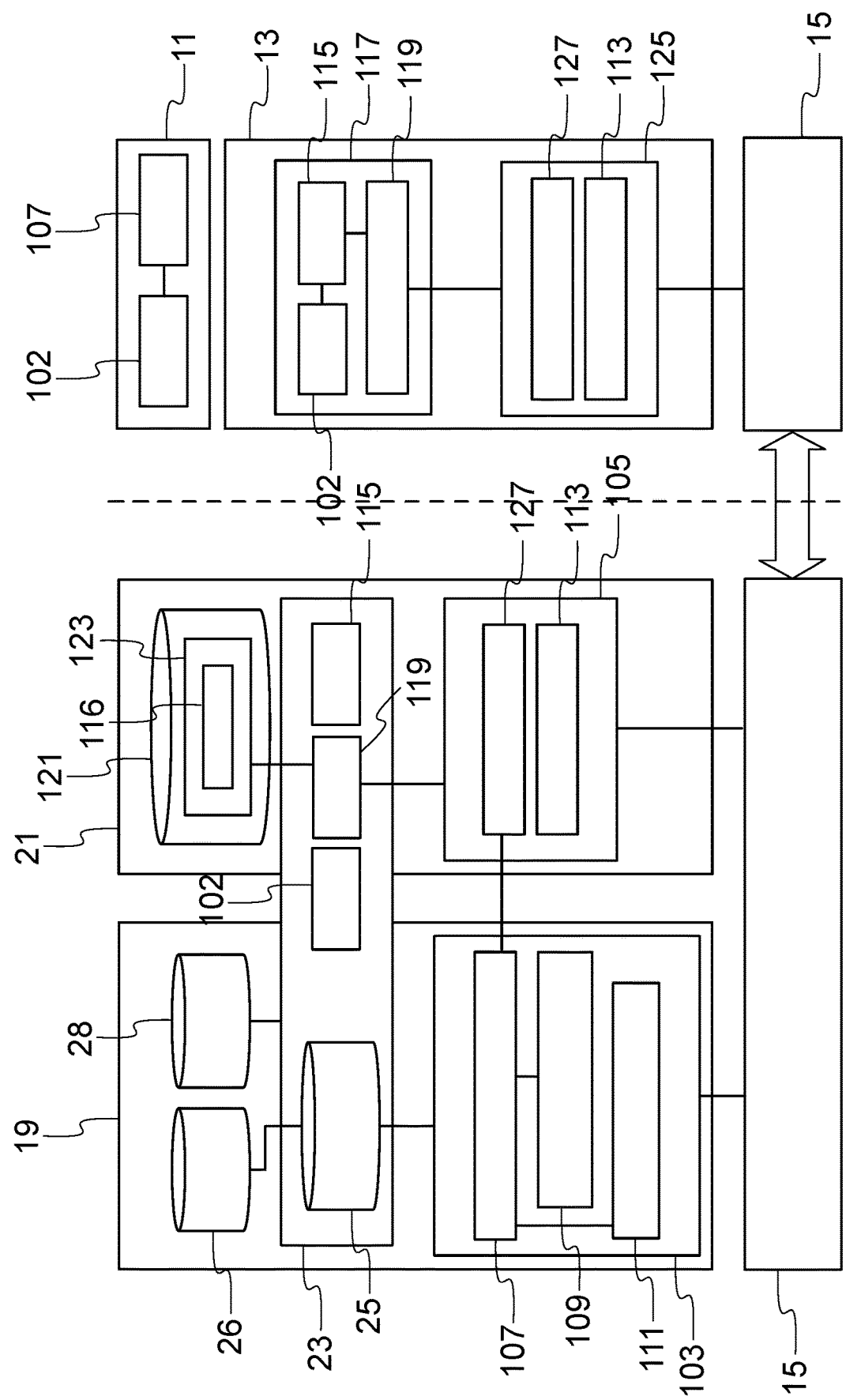
FIG. 2 is a block diagram illustrating some data elements used in the present invention according to an example of the present invention.
Figure 3:
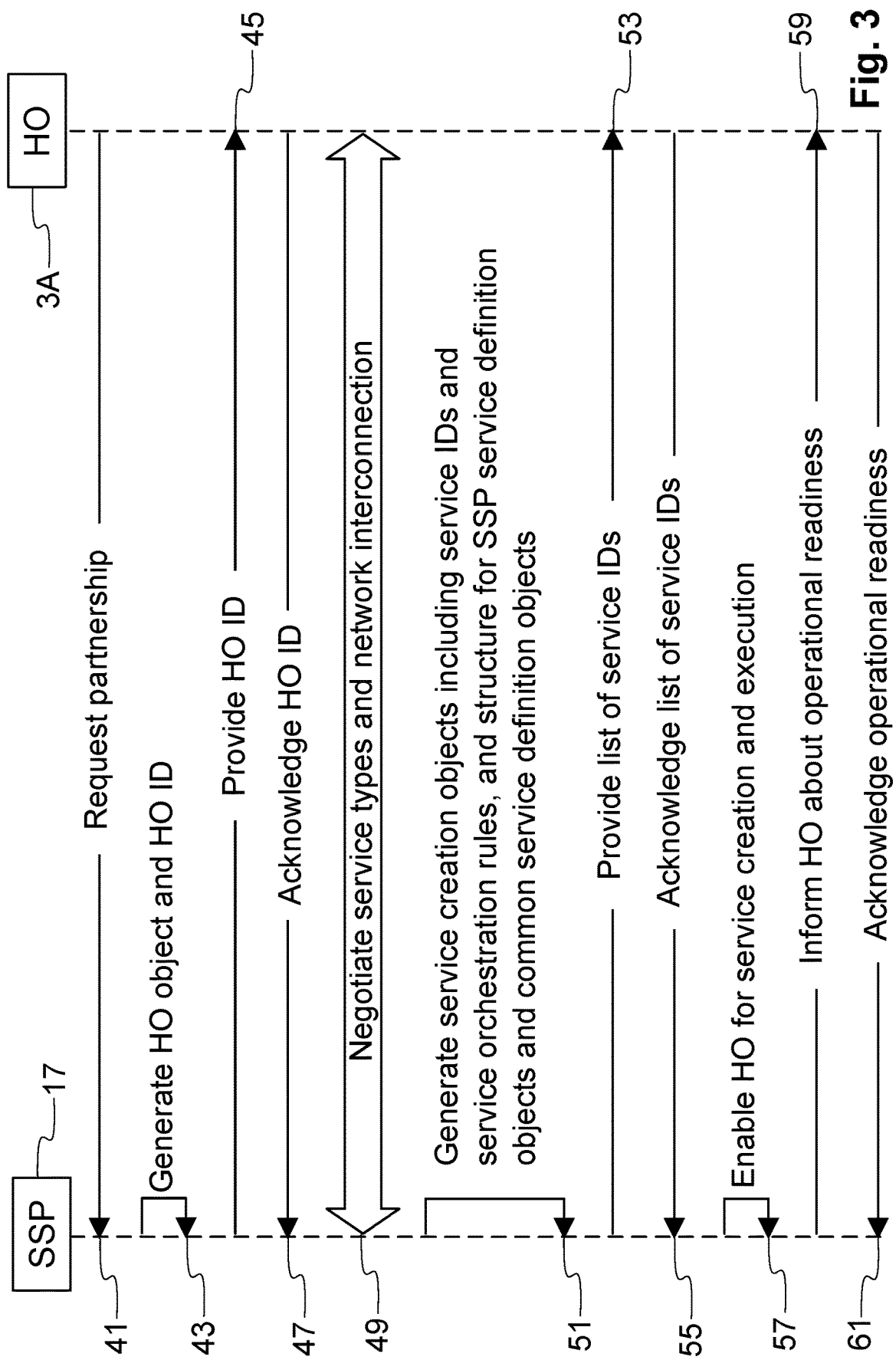
FIG. 3 is a flow chart summarising a procedure of creating and establishing a home operator within a sponsor service provider service domain according to an example of the present invention.

The service orchestration method according to an example of the present invention is explained next with reference to the block diagram of FIG. 2 and the flow charts of FIGS. 3 to 6. In FIG. 2, the elements on the left-hand side of the dashed line are part of the sponsor service provider domain 17, whereas the elements on the right-hand side are part of any one of the home operator service domains. In the present description, orchestration is understood to mean the automated arrangement, coordination, and/or management of services. The flow chart of FIG. 3 illustrates the process of creating and establishing a home operator within the sponsor service provider domain 17. In the following description, when referring to a home operator, this operator is understood to be any one of the home operators (including the MVNO) of FIG. 1. Furthermore, in the flow charts, HO denotes the home operator, whereas SSP denotes the sponsor service provider. In step 41, the home operator requests a partnership with the sponsor service provider. After that, the home operator and the sponsor service provider negotiate a commercial contract. In step 43, as a result of the negotiation, the sponsor service provider generates the home operator object 23 for that particular home operator and a home operator identifier (ID) 102, which is a unique ID identifying that particular home operator within the sponsor service provider domain 17. The home operator ID 102 is added to the home operator object 23. In step 45, the sponsor service provider sends the home operator ID 102 to the home operator and in step 47, the home operator acknowledges receipt of the home operator ID 102.

In step 49, the home operator and the sponsor service provider negotiate service types including commercial and technical service delivery conditions and network interconnection. In step 51, the sponsor service provider generates a sponsor service provider service creation object 103 and a (data) structure for a sponsor service provider service definition object 105 for that particular home operator and for each service offered to this particular home operator. The structure for the sponsor service provider service definition object 105 comprises also a service type definition, such as voice, multimedia etc. Sponsor service provider service IDs 107, referred to simply as service IDs, are also generated by the sponsor service provider so that each sponsor service has its own unique ID. The service ID 107 is added to the service creation object 103 of that particular service. The service ID 107 is a unique ID identifying the respective service, which the home operator can order from the sponsor service provider domain 17. A service orchestration rules object 109, its content, a service billing rules object 111 and its content are all generated for each service by the sponsor service provider and added to the service creation object 103. The sponsor service provider provides various sponsor services, which are orchestrated according to the pre-defined service orchestration rules. This step also comprises generating a data structure for a common service definition object 113. However, no content is generated at this moment for the common service definition object 113, also referred to simply as a service definition object or service definition (data) set. The common service definition object 113 is added to the sponsor service provider service definition object 105. It is to be noted that it is possible to merge steps 49 and 51 into one single step.

In step 53, the sponsor service provider sends a list of service IDs 107 to the home operator, which in step 55, acknowledges receipt of the list of service IDs 107. In step 53, the sponsor service provider may also provide the structure of the common service definition object 113 to the home operator if this has not already been done previously. In step 57, the sponsor service provider enables the home operator for service creation and execution. In step 59, the sponsor service provider informs the home operator about operational readiness, and in step 61, the home operator acknowledges the operation readiness of the sponsor service provider.

Figure 4:
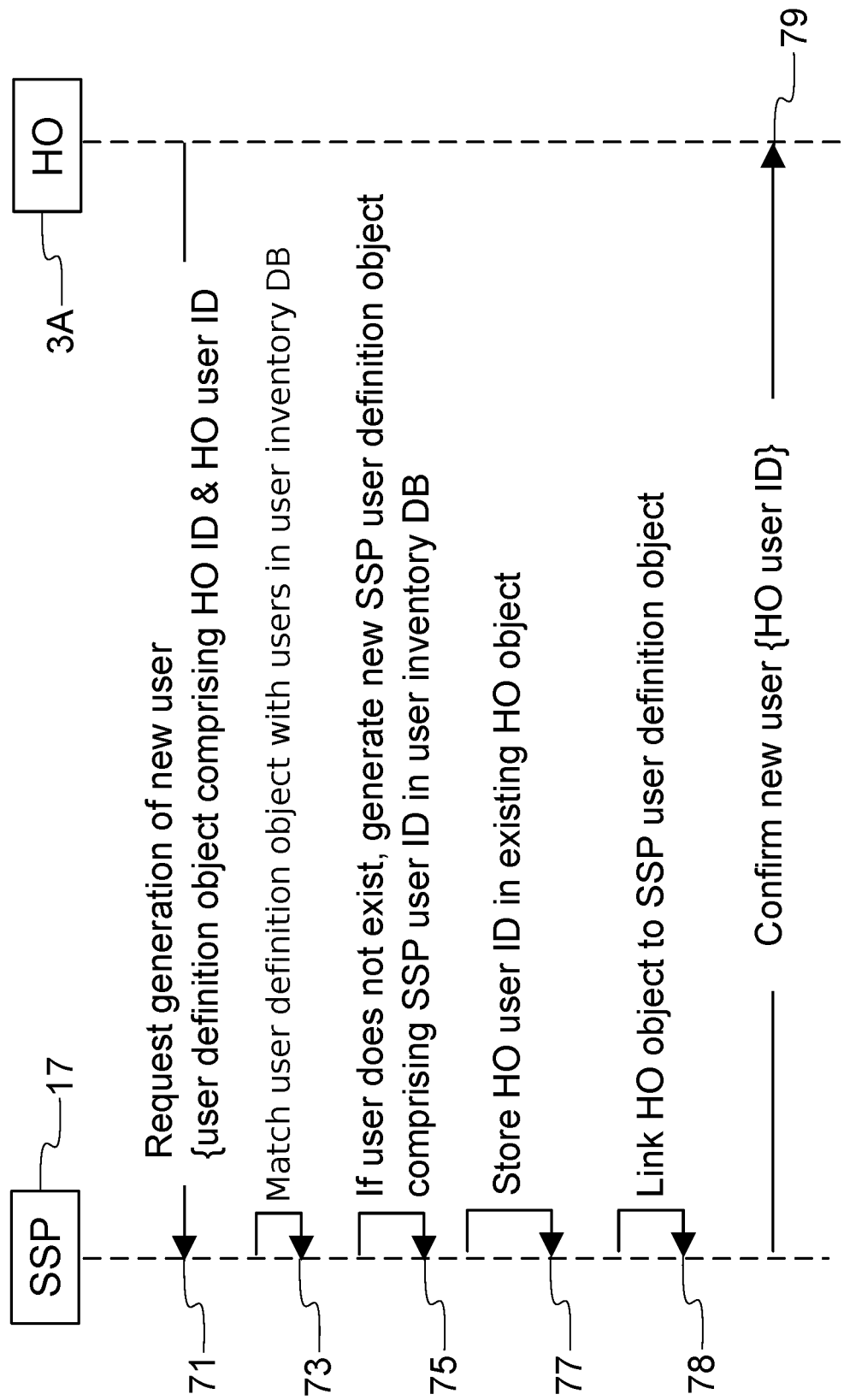
FIG. 4 is a flow chart summarising a procedure of creating a user within the sponsor service provider service domain according to an example of the present invention.

The flow chart of FIG. 4 illustrates the process of creating or registering a user or subscriber within the sponsor service provider domain 17. In step 71, the home operator requests registration of a new user within the sponsor service provider domain 17. In this example, the request comprises two parameters, namely the home operator ID 102 provided to the home operator in step 45, and a home operator user ID 115, which are both part of a home operator user definition object 117. The home operator user definition object 117 is generated by the home operator for example when the user signs a contract with the home operator, ie when the user becomes a customer of the home operator. As shown in FIG. 2, in this example the home operator user definition object 117 further comprises a home operator subscription ID 119, referred to simply as a subscription ID, which is not however needed in step 71. It is also to be noted that that the subscription ID 119 may not yet exist at this moment. The home operator user ID 115 is generated by the home operator, and is a unique ID used for registering the user within the sponsor service provider. The subscription ID 119 is also generated by the home operator, and is a unique ID used to create a subscription within the sponsor service provider as explained later. The home operator user ID 115 may be for example a contract number between the home operator and the user, while the subscription ID 119 may be for example a phone number of the user, such as the mobile station international subscriber directory number (MSISDN).

Referring back to the flow chart of FIG. 4, in step 73, the sponsor service provider determines whether or not this user already exists in its existing user inventory database 121 located in the sponsor service provider user inventory domain 21. If it is determined that the user does not exist in the database 121, then in step 75 the sponsor service provider generates a sponsor service provider user definition object 123 in the user inventory database 121 and adds a sponsor service provider user ID 116 to the generated user definition object 123 as a parameter. The sponsor service provider generates the sponsor service provider user ID 116 for the home operator user ID 115 and links them together. The sponsor service provider user ID 116 may be different from the home operator user ID 115. This is advantageous if the same user has subscriptions in at least two different home operator service domains. Thus, the sponsor service provider user ID 116 may cover more than one home operator user ID 115 of a single end user and may thus be considered as a general user ID of a particular user. In step 77, the sponsor service provider stores the home operator user ID 115 in the home operator object 23 identified by the home operator ID 102. In step 78, the sponsor service provider connects the home operator object 23 to the sponsor service provider user definition object 123. After this step, there is a link on the sponsor service provide side between the user for which the registration was requested and the home operator whose customer the user is. In step 79, the sponsor service provider confirms the registration of the new user to the home operator. In the confirmation, the home operator user ID 115 may be used as a parameter. If in step 73 it was determined that the user already exists in the database 121, there is no need to generate a new user definition object and the process continues in step 77.

Figure 5:
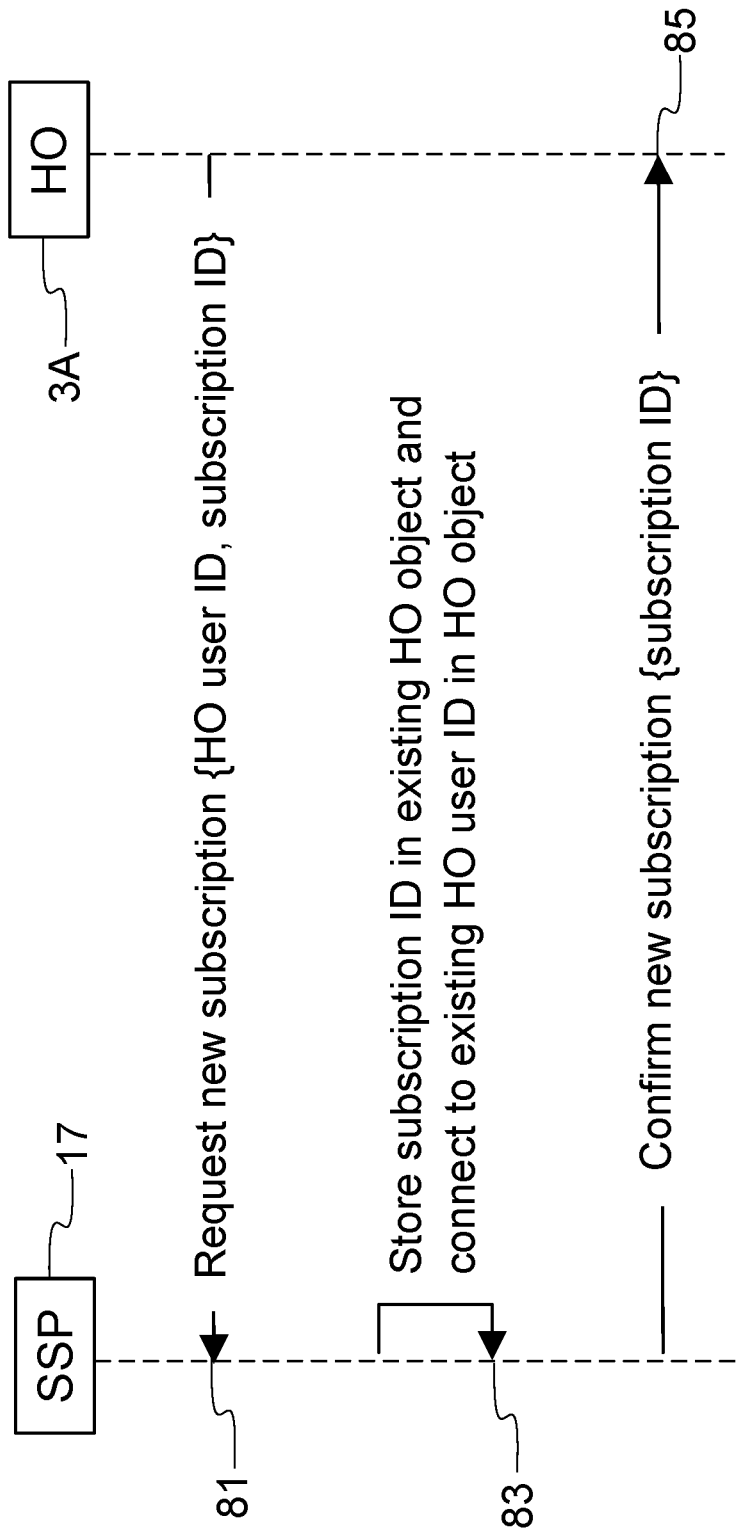
FIG. 5 is a flow chart summarising a procedure of creating a subscription within the sponsor service provider service domain according to an example of the present invention.

The flow chart of FIG. 5 illustrates the process of registering or creating a user subscription within the sponsor service provider domain 17. In step 81, the home operator sends a request to the sponsor service provider to register a new subscription in the sponsor service provider domain 17. In this example, the request comprises two parameters, namely the home operator user ID 115 and the home operator subscription ID 119. In step 83, the sponsor service provider stores the received subscription ID 119 in the home operator object 23 corresponding to the home operator that sent the request in step 81. In this step, the sponsor service provider also connects the received home operator subscription ID 119 with the existing home operator user ID in the home operator object 23. In step 85, the sponsor service provider confirms the new subscription to the home operator. The confirmation may have the subscription ID 119 as a parameter.

Figure 6:
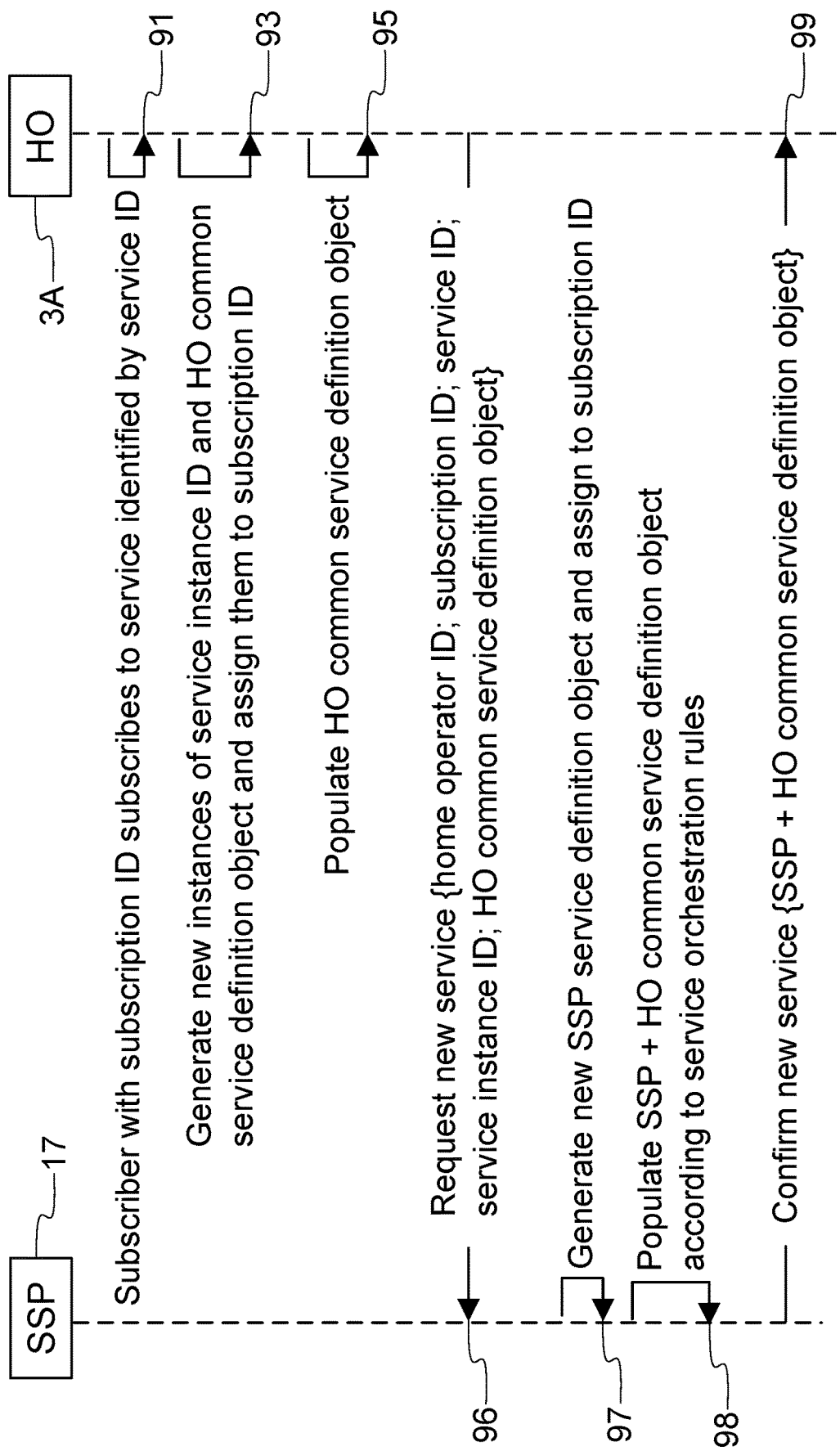
FIG. 6 is a flow chart summarising a procedure of creating a service within the sponsor service provider service domain according to an example of the present invention.

The flow chart of FIG. 6 illustrates the process of registering or creating a service within the sponsor service provider domain 17. In step 91, a user or subscriber (identified by the subscription ID 119) of the home operator subscribes to a service identified by the service ID 107. In step 93, the home operator generates a home operator service definition object 125 for the subscribed service. In this step, the home operator also generates a home operator service instance ID 127, which is included in the home operator service definition object 125. The service instance ID 127 is a unique ID and is used to create a service process between the home operator and the sponsor service provider as explained next. The service instance ID 127 will later be part of the sponsor service provider service definition object 105. In this step, the generated home operator service definition object 125 is linked with the subscription ID 119.

In step 95, the home operator populates the common service definition object 113. In other words, the home operator adds content by adding a first data set to the common service definition object 113 whose structure was negotiated and defined in the flow chart of FIG. 3. The first data set comprises user or subscriber specific data. For example, if the selected service is a push-to-talk service, then the first data set may comprise any one or a combination of the following parameters: push-to-talk group, push-to-talk role, and push-to-talk priority. In case of a corporate mobile network (CMN), the first data set could even be empty for the CMN if there is only one access point name (APN) without any option predefined for the specific corporate, but it could also include an APN, group and/or role.

In step 96, the home operator sends a new service request to the sponsor service provider. This service request concerns the service selected by the user in step 91. In this example, the service request comprises the following parameters: the home operator ID 102, the subscription ID 119, the service ID 107, the service instance ID 127 and the common service definition object 113. In step 97, the sponsor service provider creates a new sponsor service provider service definition object 105 and links this object with the corresponding subscription ID 119 of the home operator object 23. In step 98, the sponsor service provider populates the common service definition object 113 it received in step 96 according to the service orchestration rules. In other words, a second data set is added to the common service definition object 113. The second data set allows the service to be executed. For example, if the selected service is a push-to-talk service, then the second data set complementing the first data set may include push-to-talk authentication details or parameters. More broadly, the second data set may comprise service and/or communication authentication parameters relating to the selected service. In step 99, the sponsor service provider confirms the new requested service to the home operator and provides the common service definition object 113 as populated to the home operator. The confirmation may also include for instance the service ID 107 for the selected service. After this, the services can be provisioned at the home operator and sponsor service provider infrastructures and then executed. The common service definition object 113 as populated in steps 95 and 98 comprises all parameters and definitions, such as plausibility rules, ownership etc, which have to be known by both the home operator and the sponsor service provider. In order to avoid strong ties between the home operator and the sponsor service provider, it is desirable to keep the information that should be available on both sides (the home operator and sponsor service provider) to the absolute minimum. Every service has its own data structure and definitions and a close tie would lead to cross dependencies blocking service development. The home operator and the sponsor service provider may store the common service definition comprising subscription and/or service specific information, such as a service profile describing the selected service, in their respective databases for future use. At this moment, the service definition is substantially identical in both the home operator service domain and the sponsor service provider service domain.

Figure 7:
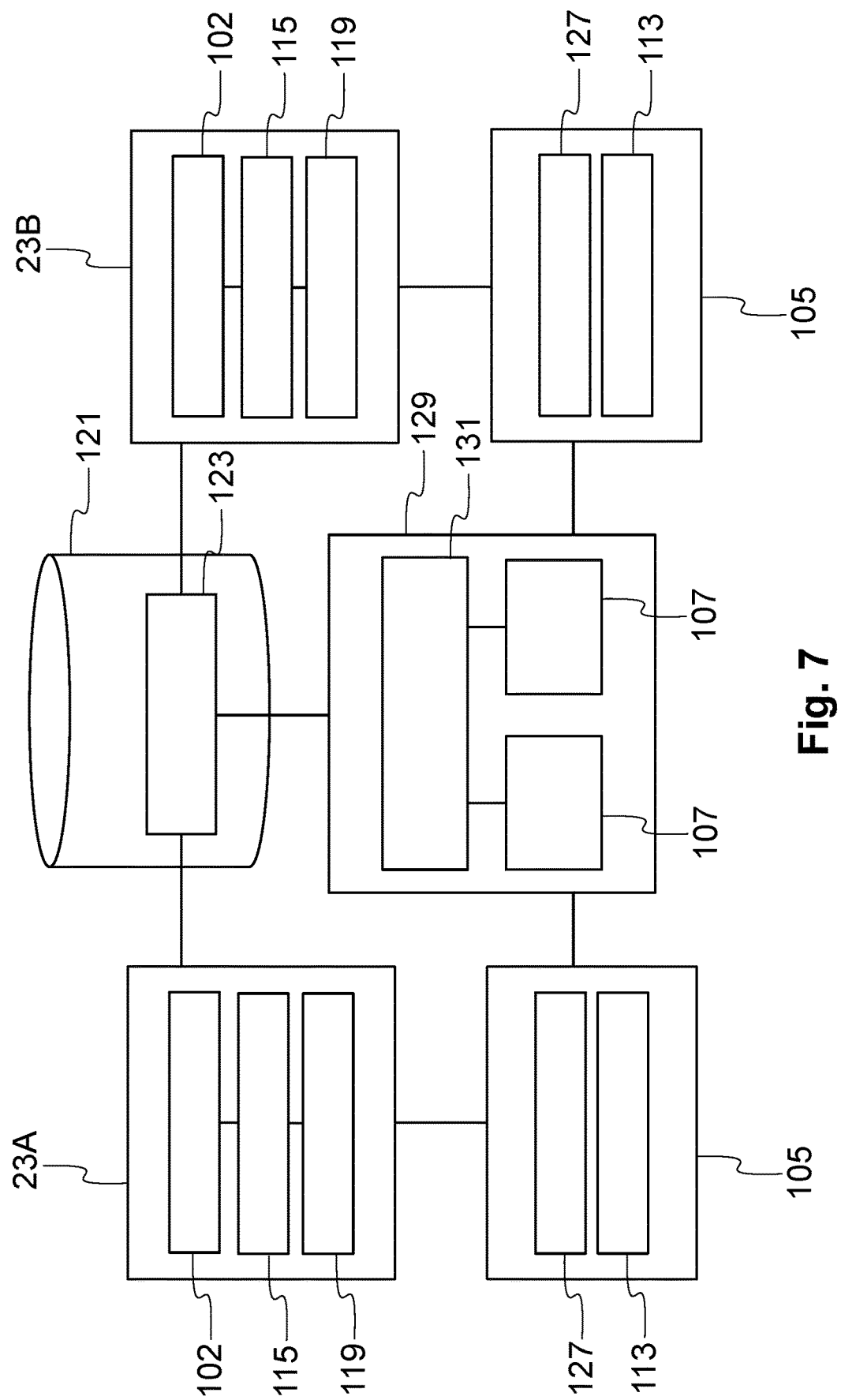
FIG. 7 is a block diagram illustrating some data elements used by a variant of the present invention.

The block diagram of FIG. 7 shows some data elements used by a variant of the present invention. According to this variant, the user identified by the home operator user ID 115 has two subscriptions of different home operators, eg a private subscription and a business subscription. For instance, one of the subscriptions could be in the first home operator service domain, while the other could be in the second home operator service domain. As shown in FIG. 7, one sponsor service provider user definition object 123 would thus be linked to or associated with two different home operator objects, ie with a first home operator object 23A and with a second home operator object 23B. As shown in FIG. 7, a service synchronisation object 129 comprising a service synchronisation rules object 131 is linked with the sponsor service provider user definition object 123. The service synchronisation rules object 131 is in turn connected to the service IDs 107 (a first service ID and a second service ID) of the different home operator service domains as shown in FIG. 7. The purpose of the service synchronisation rules object 131 is to synchronise certain properties, items and/or functionalities between the different operator service domains. For example, the following items could be synchronised: a number on a black list, contacts, call forwarding rules, voice mail service etc.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims. For instance, subscriber authentication can be added to the above service orchestration algorithm if there is no trust relationship between the home operator and the sponsor service provider. Furthermore, the order of the method steps may be interchanged and/or some steps merged and or divided into further steps.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of orchestrating services across at least two different service domains in a communication network, the method comprising the following steps carried out by a processing unit of a first service provider, referred to as a home operator, managing a first service domain:
   receiving a data structure for a service definition object from a second service provider, referred to hereinafter as a sponsor service provider, managing a second service domain, the home operator being identified by a home operator identifier;
   receiving a list of available services from the sponsor service provider, the services on the list being individually identified by a service identifier;
   receiving a subscriber selection of at least one service on the list from a subscriber of the home operator, the subscriber being identified by a subscription identifier;
   adding a first set of data to the service definition object to obtain a populated service definition object, the first set of data comprising at least subscriber specific data;
   sending a service creation request to the sponsor service provider for subscribing to the selected service, the request comprising the home operator identifier, the subscription identifier, a service identifier of the selected service, the populated service definition object and a service instance identifier; and
   receiving a response from the sponsor service provider, the response comprising the populated service definition object complemented with a second set of data to allow the selected service to be executed.

2. The method according to claim 1, wherein the method further comprises the processing unit of the home operator generating the service instance identifier in response to receiving the subscriber selection.

3. The method according to claim 1, wherein the method further comprises the processing unit of the home operator receiving the home operator identifier from the sponsor service provider.

4. The method according to claim 1, wherein the method further comprises the processing unit of the home operator generating the subscription identifier.

5. The method according to claim 4, wherein the subscription identifier comprises a telephone number of the subscriber.

6. The method according to claim 5, wherein the subscriber is further identified by a home operator user identifier generated by the processing unit of the home operator.

7. The method according to claim 6, wherein at least two different subscription identifiers are assigned to the home operator user identifier.

8. The method according to claim 7, wherein the method further comprises registering the home operator user identifier with the sponsor service provider.

9. The method according to claim 8, wherein registering the home operator user identifier comprises the sponsor service provider generating a sponsor service provider user identifier for the home operator user identifier.

10. The method according to claim 9, wherein the sponsor service provider user identifier is assigned to at least two different home operator user identifiers of a single subscriber.

11. The method according to claim 1, wherein the method further comprises the sponsor service provider synchronising data of at least two different services of a single subscriber.

12. The method according to claim 11, wherein the at least two different services are offered by at least two different home operators.

13. The method according to claim 1, wherein the second set of data comprises communication authentication parameters.

14. A processing unit of a first service provider, referred to as a home operator, and configured to manage a first service domain, for orchestrating services across at least two different service domains in a communication network, the processing unit being configured to:
   receive a data structure for a service definition object from a second service provider, referred to hereinafter as a sponsor service provider, and configured to manage a second service domain, the home operator being identified by a home operator identifier;

receive a list of available services from the sponsor service provider, the services on the list being individually identified by a service identifier;

receive a subscriber selection of at least one service on the list from a subscriber of the home operator, the subscriber being identified by a subscription identifier;

add a first set of data to the service definition object to obtain a populated service definition object, the first set of data comprising at least subscriber specific data;

send a service creation request to the sponsor service provider for subscribing to the selected service, the request comprising the home operator identifier, the subscription identifier, a service identifier of the selected service, the populated service definition object and a service instance identifier; and receive a response from the sponsor service provider, the response comprising the populated service definition object complemented with a second set of data to allow the selected service to be executed.

15. A method of orchestrating services across at least two different service domains in a communication network, the method comprising the following steps carried out by a processing unit of a second service provider, referred to as sponsor service provider, managing a second service domain:

sending a data structure for a service definition object to a first service provider, referred to hereinafter as a home operator, managing a first service domain, the home operator being identified by a home operator identifier;

sending a list of available services to the home operator, the services on the list being individually identified by a service identifier;

receiving a service creation request from the home operator for subscribing to the selected service, the request comprising the home operator identifier, a subscription identifier of a subscriber of the home operator, a service identifier of a selected service, a populated service definition object including a first set of data comprising subscriber specific data and a service instance identifier; and sending a response to the home operator, the response comprising the populated service definition object complemented with a second set of data to allow the selected service to be executed.

16. The method according to claim 15, wherein the subscription identifier comprises a telephone number of the subscriber.

17. The method according to claim 15, wherein the subscriber is further identified by a home operator user identifier generated by a processing unit of the home operator.

18. The method according to claim 17, wherein at least two different subscription identifiers are assigned to the home operator user identifier.

19. The method according to claim 17, wherein the method further comprises registering the home operator user identifier with the sponsor service provider.

20. The method according to claim 19, wherein registering the home operator user identifier comprises the sponsor service provider generating a sponsor service provider user identifier for the home operator user identifier.

21. The method according to claim 20, wherein the sponsor service provider user identifier is assigned to at least two different home operator user identifiers of a single subscriber.

22. The method according to claim 15, wherein the method further comprises the sponsor service provider synchronising data of at least two different services of a single subscriber.

23. The method according to claim 22, wherein the at least two different services are offered by at least two different home operators.

24. The method according to claim 15, wherein the second set of data comprises communication authentication parameters.

25. A computer program comprising a non-transitory storage medium containing computer readable instructions for implementing the steps of the method according to claim 15 when loaded and run on computing means of a processing unit.

26. A processing unit of a second service provider managing a second service domain, for orchestrating services across at least two different service domains in a communication network, the processing unit being configured to:

send a data structure for a service definition object to a first service provider, referred to hereinafter as a home operator, managing a first service domain, the home operator being identified by a home operator identifier;

send a list of available services to the home operator, the services on the list being individually identified by a service identifier;

receive a service creation request from the home operator for subscribing to the selected service, the request comprising the home operator identifier, a subscription identifier of a subscriber of the home operator, a service identifier of a selected service, a populated service definition object including a first set of data comprising subscriber specific data and a service instance identifier; and send a response to the home operator, the response comprising the populated service definition object complemented with a second set of data to allow the selected service to be executed.

* * * * *